United States Patent
Kaplan

(10) Patent No.: US 11,576,396 B2
(45) Date of Patent: Feb. 14, 2023

(54) AERATED SWEET EDIBLE PRODUCT AND A METHOD OF MANUFACTURING THE SAME

(71) Applicant: MATOK V'KAL LTD, Caesarea (IL)

(72) Inventor: Noam Kaplan, Tel-Aviv (IL)

(73) Assignee: MATOK V'KAL LTD., Caesarea (IL)

( * ) Notice: Subject to any disclaimer, the term of this patent is extended or adjusted under 35 U.S.C. 154(b) by 0 days.

(21) Appl. No.: 17/093,795

(22) Filed: Nov. 10, 2020

(65) Prior Publication Data

US 2021/0195912 A1 Jul. 1, 2021

(30) Foreign Application Priority Data

Dec. 25, 2019 (IL) .......................................... 271718

(51) Int. Cl.
| | | |
|---|---|---|
| *A23G 3/52* | (2006.01) | |
| *A23L 27/00* | (2016.01) | |
| *A23L 5/42* | (2016.01) | |
| *A23L 33/15* | (2016.01) | |
| *A23G 3/34* | (2006.01) | |

(52) U.S. Cl.
CPC ............. *A23G 3/52* (2013.01); *A23G 3/0014* (2013.01); *A23G 3/0051* (2013.01); *A23L 5/42* (2016.08); *A23L 27/88* (2016.08); *A23L 33/15* (2016.08)

(58) Field of Classification Search
CPC ...... A23G 3/52; A23G 3/0014; A23G 3/0051; A23L 27/88; A23L 5/42; A23L 33/15
USPC .................................. 426/660, 658, 564, 572
See application file for complete search history.

(56) References Cited

U.S. PATENT DOCUMENTS

| 2005/0163886 A1 | 7/2005 | Seielstad et al. |
| 2007/0082104 A1* | 4/2007 | De Baets ............... A21D 2/188 |
| | | 426/548 |
| 2010/0104722 A1 | 4/2010 | Francisca et al. |
| 2010/0278977 A1 | 11/2010 | Ervin |
| 2019/0313662 A1 | 10/2019 | Yamaguchi et al. |
| 2020/0000118 A1* | 1/2020 | Real Angulo ............ A23G 3/42 |

FOREIGN PATENT DOCUMENTS

| CN | 105104684 A | 12/2015 |
| CN | 106387250 A | 2/2017 |
| EP | 1817964 A1 | 8/2007 |
| WO | 2018/026255 A1 | 2/2018 |

OTHER PUBLICATIONS

Nostalgia Products Group, "Vintage Collection, Hard and Sugar Free Candy Cotton Candy Maker", Instruction Manual CCM905, published: Sep. 6, 2013, pp. 1-6, Green Bay, WI, USA.

* cited by examiner

*Primary Examiner* — Leslie A Wong
(74) *Attorney, Agent, or Firm* — The Roy Gross Law Firm, LLC; Roy Gross

(57) ABSTRACT

The subject matter discloses a sweet aerated edible product comprising a fiber composition comprising at least 40 percent by weight of fibers made of a Polysaccharide molecule, said aerated sweet edible product is manufactured using a process comprising heating the fiber composition to a melting state, rotating the melted fiber composition at high speed, generating strands from the melted fiber composition and outputting the strands. The subject matter also discloses a sweet aerated edible product comprising a fiber composition comprising non-sweet fibers with a sweetening agent.

13 Claims, No Drawings

AERATED SWEET EDIBLE PRODUCT AND A METHOD OF MANUFACTURING THE SAME

FIELD OF THE INVENTION

The present invention relates to aerated sweet edible product and a method of manufacturing the same.

BACKGROUND OF THE INVENTION

Aerated sweet edible products are commonly manufactured from sugar, called cotton candy. Sugar, in the form of powder or grains and granular, is inserted to a machine which heats the sugar to a melting temperature, then rotates the melted sugar and pushes the sugar from narrow outlets to form strands or other elongated sticky strings of sugar. The strands are mixed with each other to form a bulk of aerated product made of sugar under the name of cotton candy.

The machine for manufacturing the cotton candy may be portable, enabling to place the machine close to the consumers. The machine may be larger, for mass production, packaging and transport. The raw material used to prepare cotton candy, sugar, renders known cotton candy quote unappealing for parents to buy this product regularly. However, cotton randy is very popular among Children who love playing with the aerated texture while eating a sweet candy.

SUMMARY OF THE INVENTION

It is an object of the subject matter to disclose a sweet aerated edible product comprising a fiber composition comprising at least 40 percent by weight of fibers made of a Polysaccharide molecule, said aerated sweet edible product is manufactured using a process comprising heating the fiber composition to a melting state, rotating the melted fiber composition at high speed, generating strands from the melted fiber composition and outputting the strands.

In some cases, the fiber composition comprises Fructooligosaccharides. In some cases, the amount of sugar in the fiber composition is less than 10 percent by weight. In some cases, the fiber composition comprises only a combination of a sweet fiber and a non-sweet fiber.

In some cases, the sweet fiber is selected from a group consisting of tapioca fiber, polydextrose fiber, maltodextrin fiber, chicory root fibers, inulin fibers, beet fibers and a combination thereof. In some cases, the non-sweet fiber is selected from a group consisting of dextrin-based fibers, fibers made of platango ovata (Psyllium), Pectin, oatmeal fiber, and a combination thereof. In some cases, the fiber composition comprises 100 percent of a sweet fiber.

In some cases, the aerated edible product further comprising at least one edible vitamin composition. In some cases, the aerated edible product further comprising at least one edible flavor enhancer composition. In some cases, the aerated edible product further comprising at least one edible food coloring composition. In some cases, the aerated edible product further comprising at least one edible mineral composition.

It is an object of the subject matter to disclose a method for preparing a sweet aerated edible product, comprising obtaining a fiber composition comprising at least 40 percent by weight of fibers made of a Polysaccharide molecule, said aerated sweet edible product is manufactured using a process comprising heating the fiber composition to a melting state rotating the melted fiber composition at high speed generating strands from the melted fiber composition and outputting the strands.

A sweet aerated edible product comprising an edible composition comprising a mixture of at least 90 percent by weight of a non-sweet fiber and at least 0.5 percent by weight of a sweetening agent, said aerated sweet edible product is manufactured using a process comprising heating the edible composition to a melting state, rotating the melted edible composition at high speed, generating strands from the melted edible composition and outputting the strands.

In some cases, the non-sweet fiber is selected from a group consisting of dextrin-based fibers, fibers made of platango ovata (Psyllium), Pectin, oatmeal fiber, Inulin. and a combination thereof. In some cases, the aerated edible product further comprising at least one edible vitamin composition. In some cases, the aerated edible product further comprising at least one edible flavor enhancer composition. In some cases, the aerated edible product further comprising at least one edible food coloring composition. In some cases, the aerated edible product further comprising at least one edible mineral composition.

DESCRIPTION OF THE INVENTION

The present invention discloses a sweet aerated food product made of edible fibers. The edible fibers comprise Polysaccharides molecules that provide the sweetening taste of the aerated food product without adding sugar. This way, the aerated food product has positive nutritional values due to the fibers, which makes it appealing to parents, while the taste and texture remain the same as in cotton candy made of sugar. The manufacturing processes disclosed below are substantially similar to those that use sugar as a raw material. The fiber composition used to manufacture the aerated food product may comprise one or more fiber compositions, inputted into the manufacturing process in a condition desired by a person skilled in the art, such as grains, powder, granular, paste and the like.

In some exemplary embodiments, a first fiber of the fiber composition has a first melting temperature and a second fiber of the fiber composition has a second melting temperature. In order to align the melting time of the first fiber to the melting time of the second fiber, the fiber with the higher melting point is heated before inserted into the machine. This way, the time required to heat both fibers is substantially close, for example less than 5 seconds.

The subject matter discloses a sweet aerated food product made of a fiber having molecules of Polysaccharides. The fiber composition used to manufacture the sweet aerated food product may comprise additional fibers that lack any sweet taste. In some exemplary embodiments, the aerated food product is made only from fibers. In some other embodiments, the aerated food product is made of fibers and some food coloring, to render the aerated food product more appealing. The food coloring may be in the range of about 0.01%-0.8% by weight of the composition.

The sweet aerated food product comprises a fiber composition having a first portion made of fiber having a Polysaccharide molecule. This fiber is also defined herein as a "sweet fiber". The fiber composition having a Polysaccharide molecule may be a tapioca fiber, polydextrose fiber, maltodextrin fiber chicory root fibers, inulin fibers, Fructooligosaccharides, beet fibers and other fibers having a sweet taste or a sweet residue desired by a person skilled in the art. The first portion may include multiple different fibers having a Polysaccharide molecule.

In some exemplary cases, the fiber composition having a second portion made of fiber lacking a Polysaccharide molecule or any other sweet taste or sweet residue, also defined herein as a "non-sweet fiber". The fiber of the second portion may be added to enable various textures of the aerated food product. The fibers of the second portion are also likely to reduce the manufacturing cost of the aerated food product, as they are likely to cost less than haft of the fibers of the first portion. Examples of fibers of the second portion may include dextrin-based fibers such as Nutriose, which can also function as a bulking agent. Other examples include fibers made of plant seeds such as fibers made of platango ovata (*Psyllium*), Pectin, oatmeal fiber, polydextrose fiber and other fibers lack any sweet taste desired by a person skilled in the art.

When manufactured from the first portion and the second portion, the fiber composition used to manufacture the sweet aerated food product comprises:

at least about 20% by weight of the composition of non-sweet fibers and at least about 40% by weight of the composition of non-sweet fibers. For example:

15% by weight of non-sweet fibers and 85% by weight of sweet fibers,

20% by weight of non-sweet fibers and 80% by weight of sweet fibers,

25% by weight of non-sweet fibers and 75% by weight of sweet fibers,

30% by weight of non-sweet fibers and 70% by weight of sweet fibers,

35% by weight of non-sweet fibers and 65% by weight of sweet fibers,

40% by weight of non-sweet fibers and 60% by weight of sweet fibers,

45% by weight of non-sweet fibers and 55% by weight of sweet fibers,

50% by weight of non-sweet fibers and 50% by weight of sweet fibers,

55% by weight of non-sweet fibers and 45% by weight of sweet fibers,

60% by weight of non-sweet fibers and 40% by weight of sweet fibers.

It should be noted that in some exemplary embodiments, the composition for manufacturing the aerated food product comprises 98-99.95% of the fiber composition and 0.05%-2% of minerals, vitamins, sweetening agent, food coloring or other edible supplement. The fiber composition in these exemplary embodiments comprises about 20% by weight of the composition of non-sweet fibers and at least about 40% by weight of the composition of non-sweet fibers The subject matter also discloses an aerated edible food product manufactured from an edible composition including one or more non-sweet fibers mixed with a sweetening agent. The sweetening agent may include 0.2%-10% by weight of the composition used to manufacture the food product. For example:

The edible composition may include 95% by weight of a non-sweet fiber and 5% by weight of the sweetening agent.

The edible composition may include 85% by weight of a first non-sweet fiber, 12% by weight of a second non-sweet fiber and 3% by weight of the sweetening agent.

The edible composition may include 75% by weight of a first non-sweet fiber, 22% by weight of a second non-sweet fiber and 3% by weight of the sweetening agent.

The edible composition may include 65% by weight of a first non-sweet fiber, 32% by weight of a second non-sweet fiber and 3% by weight of the sweetening agent.

The edible composition may include 55% by weight of a first non-sweet fiber, 42% by weight of a second non-sweet fiber and 3% by weight of the sweetening agent.

EXAMPLES

The invention will be described in greater detail by way of specific examples. The following examples are offered for illustrative purposes, and to exemplify the sweet aerated food product and methods described herein and are not intended to limit the invention in any manner. Many variations will suggest themselves and are within the full intended scope. Those of skill in the art will readily recognize a variety of non-critical parameters which can be changed or modified to yield essentially the same results. It should be noted that at least some of the materials listed below in a specific form, such as powder, can also be used in other forms as desired by a person skilled in the art.

Example 1—Sweet Aerated Food Product Made of Two Sweet Fibers Only 120 grams of Inulin fibers are mixed with 280 grams of beet fibers inside a container. Both fibers are in the form of powder. As the melting temperature of the Inulin is 190 degrees Celsius and the melting temperature of the beet fibers is higher, the beet fibers may be heated to a predefined temperature. Then, both the beet fiber and the inulin fiber are poured into a machine which manufactures the sweet aerated food product. The machine then heats both fibers to a certain temperature, for example 180 degrees Celsius. The machine used to manufacture the sweet aerated food product also spins the mixture of the Inulin fibers and the beet fibers at a speed in the range of 1,000-5,000 revolutions per minute. The machine then outputs strands of the heated composition via small apertures, while keeping the spinning movement. The strands are mixed due to the spinning movement. The mixed strands are then cut into pieces of a certain size and packed. The size may be defined by, weight, volume of length of the mixed strands.

Example 2—Sweet Aerated Food Product Made of One Sweet Fiber and One Non-Sweet Fiber Only 120 grams of Inulin fibers are mixed with 120 grams of dextrin-based fibers inside a container. Both fibers are in the form of powder. The manufacturing process is elaborated in detail below.

Example 3—Sweet Aerated Food Product Made of Two Sweet Fibers and One Non-Sweet Fiber Only 60 grams of inulin fibers are mixed with 60 grams of tapioca fibers and 120 grams of oatmeal fibers inside a container. The inulin and oatmeal fibers are in the form of powder while the tapioca fibers are in the form of grains granules. The manufacturing process is elaborated in detail below.

Example 4—Sweet Aerated Food Product Made of Two Sweet Fibers, Food Coloring and One Non-Sweet Fiber Only 60 grams of Inulin fibers are mixed with 60 grams of tapioca fibers, 0.5 grams of food coloring and 120 grams of oatmeal fibers inside a container. The Inulin and oatmeal fibers are in the form of powder while the tapioca fibers are in the form of grains. The manufacturing process is elaborated in detail below.

Example 5—Sweet Aerated Food Product Made of Two Sweet Fibers and Two Non-Sweet Fibers Only 60 grams of Inulin fibers are mixed with 60 grams of tapioca fibers, 120 grams of polydextrose fibers and 120 grams of oatmeal fibers inside a container. The Inulin, polydextrose fibers and oatmeal fibers are in the form of powder while the tapioca fibers are in the form of grains. The manufacturing process is elaborated in detail below.

Example 6—Sweet Aerated Food Product Made of a Non-Sweet Fiber with a Sweetening Agent 98 grams of polydextrose fibers are mixed with 2 grams of sweet potato extract. The polydextrose fibers and sweet potato extract are in the form of powder. The manufacturing process is elaborated in detail below.

Example 7—Sweet Aerated Food Product Made of a Sweet Fiber, Non-Sweet Fiber and a Vitamin Edible Supplement 60 grams of Inulin fibers are mixed with 98 grams of polydextrose fibers and 2 grams of vitamin D extract. The inulin, polydextrose fibers and vitamin D extract are in the form of powder. The manufacturing process is elaborated in detail below.

Example 8—Sweet aerated food product made of a sweet fiber and a sweetening agent. For example, the composition may include 97% by weight of maltodextrin fibers mixed with 3% by weight of sucralose. The maltodextrin and sucralose are both in the form of powder. The manufacturing process is elaborated in detail below.

Example 9—one non-sweet fibers mixed with a sweetening agent. For example, 60 grams of oat fibers are mixed with 3.5 grams of steviol glycosides. The oat fibers, steviol glycosides are in the form of powder. The manufacturing process is elaborated in detail below.

Manufacturing Process

The subject matter also discloses a method of manufacturing the sweet aerated food product. The method may be performed on-site, for example in a mall or a party; and provided to consumers within minutes after manufacture. The method may also be performed in a factory, and include packing the aerated food product in order to keep the food product's structure. The amount of material inserted into the machine may be selected by a person skilled in the art. The sweet aerated food product of the subject matter may be manufactured in additional methods not disclosed herein.

The method of the subject matter comprises obtaining a fiber composition having one or more fibers. At elaborated above, the fiber composition may have multiple options:
1. Sweet fibers,
2. A combination of sweet fibers and non-sweet fibers,
3. Non-sweet fibers with a sweetening agent.

The amount of the fiber composition may be determined based on the size of the machine used to manufacture the sweet aerated food product.

After obtaining the fiber composition, the method comprises heating the fiber composition to a desired temperature. Such temperature may be a melting temperature of the fibers included in the fiber composition. The melting temperature may be inputted into the manufacturing machine automatically or by a person using the machine. The melting machine may be in the range of 120-300 degrees Celsius. The time required to heat the fiber composition may be determined by various properties such as the heating power of the machine, amount of material inputted into the machine, type of fibers of the fiber composition, temperature of the fibers in the fiber composition, humidity level in the surroundings of the machine, bulk density of the fibers, and the like. In some experiments made by applicant, 20 grams of fiber composition reached a temperature of 180 degrees Celsius within 2-30 seconds.

The method for preparing the sweet aerated food product also comprises spinning the fiber composition. At least some of the spinning process is performed when the fiber composition is in a melting state. The spinning may be performed when the fiber composition is contained in a container inside the machine. The spinning may be around a vertical axis, or a combination of vertical and horizontal axes. The speed of the spinning may be in the range of 1000-5000 rounds per minute. The speed may vary according to the type of fibers in the fiber composition and according to the capacity needed. The spinning may take place after a portion of the heating process. For example, heating takes place 5 seconds, and the spinning begins after 3 seconds of the heating.

The method for preparing the sweet aerated food product also comprises creating strands from the melted fiber composition. The strands may be created by outputting the melted fiber composition via small apertures of the machine. The size of the apertures may be in the range of 2-20 millimeters. The strands are formed into a bulk by the spinning movement of the container while outputted from the apertures.

The method for preparing the sweet aerated food product may also comprise cutting the bulk of strands to pieces. The cutting may be performed when the bulk of strands is transferred onto a conveyor belt. The method for preparing the sweet aerated food product also comprises packing the pieces to prevent exposure of the aerated food product to air. In some cases, the pieces are packed less than 30 minutes after the strands are outputted from the apertures.

The type of package used to pack the aerated food product is capable to form a barrier that keeps the structure of the aerated food product, for example prevent passage of air into the package. The package may be made of polyethylene, polypropylene, aluminum, polystyrene, a combination thereof and any other packaging material desired by a person skilled in the art.

General Definitions

Each of the following terms written in singular grammatical form: 'a', 'an', and 'the', as used herein, means 'at least one', or 'one or more'. Use of the phrase 'one or more' herein does not alter this intended meaning of 'a', 'an', or 'the'. Accordingly, the terms a', 'an', and 'the', as used herein, may also refer to, and encompass, a plurality of the stated entity or object, unless otherwise specifically defined or stated herein, or, unless the context clearly dictates otherwise.

Each of the following terms: 'includes', 'including', 'has', 'having', 'comprises', and 'comprising', and, their linguistic/grammatical variants, derivatives, or/and conjugates, as used herein, means 'including, but not limited to', and is to be taken as specifying the stated component(s), feature(s), characteristic(s), parameter(s), integer(s), or step(s), and does not preclude addition of one or more additional component(s), feature(s), characteristic(s), parameter(s), integer(s), step(s), or groups thereof. Each of these terms is considered equivalent in meaning to the phrase 'consisting essentially of' Each of the phrases 'consisting of' and 'consists of', as used herein, means 'including and limited to.'

The phrase 'consisting essentially of', as used herein, means that the stated entity or item (composition, product, material, method or process, step or procedure, sub-step or sub-procedure), which is an entirety or part of an exemplary embodiment of the disclosed invention, or/and which is used for implementing an exemplary embodiment of the disclosed invention, may include at least one additional component or ingredient, but only if each such additional component or ingredient does not materially alter the basic novel and inventive characteristics or special technical features, of the claimed entity or item.

The term 'method', as used herein, refers to steps, procedures, manners, means, or/and techniques, for accomplishing a given task including, but not limited to, those steps, procedures, manners, means, or/and techniques, either known to, or readily developed from known steps, procedures, manners, means, or/and techniques, by practitioners in the relevant field(s) of the disclosed invention.

Throughout this disclosure, a numerical value of a parameter, feature, characteristic, object, or dimension, may be stated or described in terms of a numerical range format. Such a numerical range format, as used herein, illustrates implementation of some exemplary embodiments of the invention, and does not inflexibly limit the scope of the exemplary embodiments of the invention. Accordingly, a stated or described numerical range also refers to, and encompasses, all possible sub-ranges and individual numerical values (where a numerical value may be expressed as a whole, integral, or fractional number) within that stated or described numerical range. For example, a stated or described numerical range 'from 1 to 6' also refers to, and encompasses, all possible sub-ranges, such as 'from 1 to 3', 'from 1 to 4', 'from 1 to 5', 'from 2 to 4', 'from 2 to 6', 'from 3 to 6', etc., and individual numerical values, such as '1', '1.3', '2', '2.8', '3', '3.5', '4', '4.6', '5', '5.2', and '6' within, the stated or described numerical range of 'from 1 to 6'. This applies regardless of the numerical breadth, extent, or size, of the stated or described numerical range.

Moreover, for stating or describing a numerical range, the phrase 'in a range of between about a first numerical value and about a second numerical value', is considered equivalent to, and meaning the same as, the phrase 'in a range of from about a first numerical value to about a second numerical value', and, thus, the two equivalently meaning phrases may be used interchangeably. For example, for stating or describing the numerical range of room temperature, the phrase 'room temperature refers to a temperature in a range of between about 20° C. and about 25° C.', and is considered equivalent to, and meaning the same as, the phrase 'room temperature refers to a temperature in a range of from about 20° C. to about 25° C.' The term 'about', as used herein, refers to ±10% of the stated numerical value.

It is to be fully understood that certain aspects, characteristics, and features, of the invention, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the invention which are illustratively described and presented in combination or sub combination in the context or format of a single embodiment, may also be illustratively described and presented in the context or format of a plurality of separate embodiments.

Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. An aerated edible cotton candy product comprising:
   a fiber composition comprised of at least 70 percent by weight of Fructooligosaccharides fibers;
   wherein the fiber composition undergoes an aeration process to increase its sweetness, such that the aeration process comprises:
     heating the fiber composition to a melting state;
     rotating the fiber composition at high speed to generate strands from the melted fiber composition; and
     cutting and packing the strands to generate the aerated cotton candy edible product,
   wherein the aerated edible product does not comprise sugar and is sweetening agent less.

2. The aerated edible cotton candy product of claim 1, wherein the aerated edible cotton candy product is further comprised of at least one non-sweet fiber.

3. The aerated edible cotton candy product of claim 2, wherein the aerated edible product is further comprised of fibers selected from a group consisting of tapioca fiber, polydextrose fiber, chicory root fibers, inulin fibers, beet fibers, and any combination thereof.

4. The aerated edible cotton candy product of claim 2, wherein the non-sweet fiber is selected from a group consisting of dextrin-based fibers, fibers made of platango ovata (*Psyllium*), Pectin, oatmeal fiber, maltodextrin fiber, and any combination thereof.

5. The aerated edible cotton candy product of claim 1, wherein the aerated edible product further comprises at least one edible vitamin composition.

6. The aerated edible cotton candy product of claim 1, wherein the aerated edible product further comprises at least one edible flavor enhancer composition.

7. The aerated edible cotton candy product of claim 1, wherein the aerated edible product further comprises at least one edible food coloring composition.

8. The aerated edible cotton candy product of claim 1, wherein the aerated edible product further comprises at least one edible mineral composition.

9. The aerated edible cotton candy product of claim 1, wherein the Fructooligosaccharides is in the form of a powder.

10. The aerated edible cotton candy product of claim 2, wherein the at least one non-sweet fiber is in the form of a powder.

11. The aerated edible product of claim 1, wherein the Fructooligosaccharides fibers are inulin fibers and beet fibers.

12. The aerated edible product of claim 1, wherein the fiber composition is comprised of 100 percent by weight of Fructooligosaccharides fibers.

13. The aerated edible product of claim 1, wherein the fiber composition is comprised of at least 90 percent by weight of Fructooligosaccharides fibers.

* * * * *